H. LEWIS.
ADJUSTABLE HANDLE.
APPLICATION FILED JUNE 18, 1919. RENEWED JUNE 27, 1921.

1,405,712.
Patented Feb. 7, 1922.

Inventor
Harrison Lewis
by Westall and Wallace
his Attorneys

UNITED STATES PATENT OFFICE.

HARRISON LEWIS, OF LOS ANGELES, CALIFORNIA.

ADJUSTABLE HANDLE.

1,405,712. Specification of Letters Patent. Patented Feb. 7, 1922.

Application filed June 18, 1919, Serial No. 305,166. Renewed June 27, 1921. Serial No. 480,907.

*To all whom it may concern:*

Be it known that I, HARRISON LEWIS, a citizen of the United States, residing at Los Angeles, in the county of Los Angeles and State of California, have invented new and useful Improvements in an Adjustable Handle, of which the following is a specification.

This invention relates to a mechanical movement especially adapted to serve for connecting an implement, such as a tooth brush or knife blade, to a handle.

It is an object of this invention to provide a connecting joint for a handle and implement, so that the implement may be placed in any desired position relative to the handle and held in any such selected position, an element being provided for such movement and for holding the implement in adjusted position.

Figure 1:
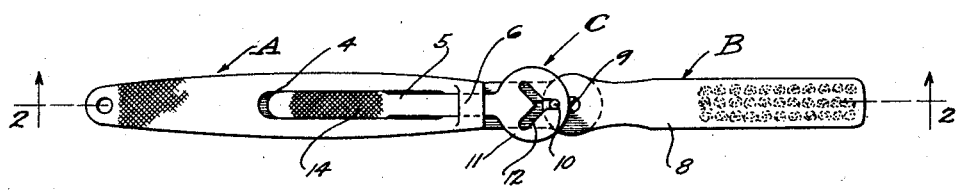
Figure 2:
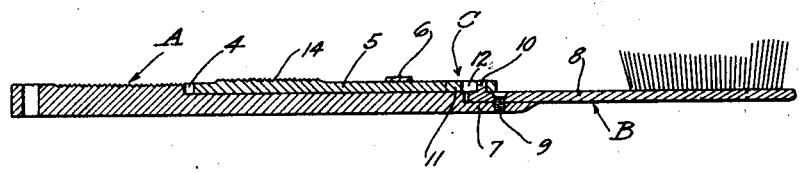
Figure 3:
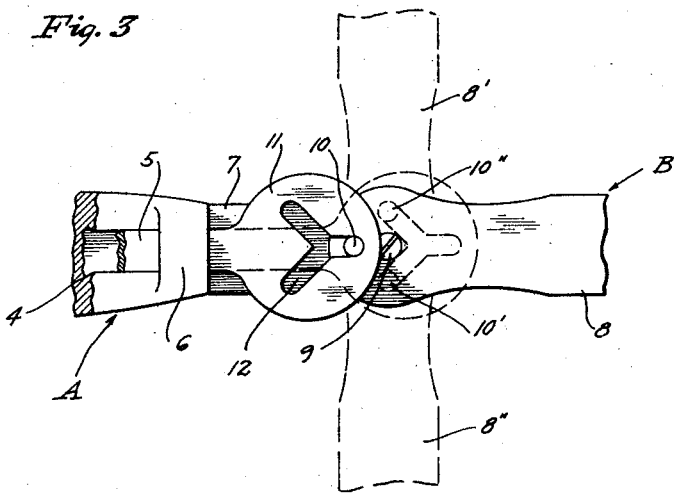

These objects will be more fully understood, as will also other objects and corresponding accomplishments of my invention from the following detailed description of a preferred embodiment thereof. For the purpose of illustration, I have shown the invention embodied in a tooth brush illustrated in the accompanying drawing, in which:

Fig. 1 is a plan view of the brush and handle in straight line position; Fig. 2 is a section taken on the line 2—2 of Fig. 1; and Fig. 3 is an enlarged fragmentary view showing the mechanical movement, with the implement in three positions with respect to the handle.

Referring more particularly to Figs. 1 and 2, A indicates the handle proper of the instrument and B the brush. The connecting joint is indicated generally by C.

Formed in one surface of the handle is a recess 4 extending lengthwise of the handle and being disposed adjacent the shank end. The side walls of the recess are preferably undercut to hold the slide bar 5 therein. A bridge over the recess is formed at the shank end of the handle and is indicated by 6. This bridge further assists in holding the slide bar in position. The shank end is notched as indicated by 7 to receive thereon the shank of the brush.

The brush shank 8 laps over the notched end of the handle and is secured thereto by a pivot pin 9. Secured to the shank is a crank pin 10.

The slide bar 5 has a head 11 formed on the end thereof. The head is provided with a Y slot 12, the crank pin 10 being disposed in the slot 12. An elevation 14 is formed on the slide bar and preferably knurled on the top so that it may be conveniently engaged with the thumb or the finger of the hand of the user. The surface of the recess 4 in contact with the slide bar may also be roughened so that by pressing the slide bar against the handle it will be held against sliding movement.

If it is desired to hold the brush in line with the handle, slide bar 14 is maintained in the position shown in Figs. 1 and 2 by the full lines in Fig. 3. This is conveniently done by pressure of the finger upon the elevation 14. The crank pin 10 rests in one of the branches of the Y slot, and is locked against movement. Suppose it is desired to move the brush into an angle to the right. The brush is tilted in that direction, so that the weight of the shank causes the latter to tend to turn in that direction. The thumb engages the elevation 14, and the slide bar is pushed toward the brush. This will cause the crank pin 10 to ride into the left hand branch of the Y slot. The positions of the shank and crank pin are indicated by dotted lines in Fig. 3 and by the numerals 8″ and 10″. To return the brush to its straight line position, the slide bar 14 is pulled away from the brush causing the crank pin 10 to ride into the middle branch of the Y slot. To move the brush to an angular position to the left, the brush is tilted to the left and the slide bar pushed upwardly. The shank and crank pin in this position are shown in dotted lines in Fig. 3 indicated by 8′ and 10′. Any intermediate angular position may be maintained by moving the shank to that position and locking it by holding the slide bar in this adjusted position.

It is obvious that there are many purposes and instruments to which this mechanical movement may be applied. I have illustrated the invention as embodied in a tooth brush merely to show one of its applications.

What I claim is:

1. In a device of the class described, the combination of two members pivotally secured to each other, one of said members being provided with a single crank pin, a manually operable adjusting member slidably mounted on the other of said members and being provided with a head having a slot with two angular branches in which said pin is disposed whereby the angular relation of the pivotal members may be adjusted.

2. In a device of the class described, the combination of two members pivotally secured to each other, one of said members being provided with a single crank pin, a manually operable adjusting member slidably mounted on the other of said members and being provided with a head having a Y-slot in which said pin is disposed whereby the angular relation of the pivotal members may be adjusted.

In witness that I claim the foregoing I have hereunto subscribed my name this 10th day of June, 1919.

HARRISON LEWIS.